(12) United States Patent  (10) Patent No.: US 8,460,807 B2
Meehan et al.  (45) Date of Patent: Jun. 11, 2013

(54) MODULAR BATTERY DESIGN

(75) Inventors: Patrick J. Meehan, Ann Arbor, MI (US); Stuart D. Barter, Lima, NY (US); William L. Martz, Victor, NY (US); Megan J. Quick, Honeoye Falls, NY (US); Rick F. Rourke, Metamora, MI (US); Edgar M. Storm, Spencerport, NY (US); Derek R. Weber, Mendon, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 12/847,461

(22) Filed: Jul. 30, 2010

(65) Prior Publication Data

US 2012/0028098 A1  Feb. 2, 2012

(51) Int. Cl.
*H01M 10/42* (2006.01)
(52) U.S. Cl.
USPC ................ 429/49; 429/120; 29/402.01

(58) Field of Classification Search
USPC ........................................ 429/49
See application file for complete search history.

(56) References Cited

U.S. PATENT DOCUMENTS

| 2,250,490 | A | * | 7/1941 | Lormor | 414/425 |
| 5,405,713 | A | * | 4/1995 | Pecherer et al. | 429/49 |
| 2006/0216577 | A1 | * | 9/2006 | Cheng | 429/49 |
| 2012/0183820 | A1 | * | 7/2012 | Yoon et al. | 429/61 |

* cited by examiner

*Primary Examiner* — John S Maples
(74) *Attorney, Agent, or Firm* — Dinsmore & Shohl LLP

(57) ABSTRACT

A battery pack is described. One embodiment of the battery pack includes a pair of end frames, the end frames having a top and a bottom and a pair of sides, the end frames having a detent on at least one of the sides of the end frames to receive a clamp; a frame positioned between the pair of end frames, the frame having a top and a bottom and a pair of sides, the frame having a ridge on at least one of the sides of the frame; a plurality of battery cells positioned in the frame and the pair of end frames, the plurality of battery cells electrically connected to each other at the top of the frame; and at least one cooling fin positioned between the battery cells. Methods of repairing battery packs are also described.

12 Claims, 7 Drawing Sheets

MODULAR BATTERY DESIGN

BACKGROUND OF THE INVENTION

This invention relates generally to battery packs and more particularly to battery packs having a modular design.

Currently, the battery cells in some battery packs are positioned in frames which are used to house the cells, cooling fins, and, in some cases, expansion material, such as foam sheets. The frames can also be used as a conduit for liquid cooling of the cells. However, the frames are not designed with features to assist with repairing the module. In some battery packs, cell tabs are welded to a separate interconnect board. Once the battery cells are welded together, it is difficult to repair individual components in a section. If one component fails in a battery pack module fails, it is necessary to scrap the entire module.

Therefore, there is a need for a battery pack module that is easier to repair and for methods of repairing battery pack modules.

SUMMARY OF THE INVENTION

The present invention meets that need. One aspect of the invention involves a method of repairing a battery pack. In one embodiment, the method includes providing a battery pack comprising: a pair of end frames, the end frames having a top and a bottom and a pair of sides, the end frames having a detent on at least one of the sides of the end frames to receive a clamp; a frame positioned between the pair of end frames, the frame having a top and a bottom and a pair of sides, the frame having a ridge on at least one of the sides of the frame; a plurality of battery cells positioned in the frame and the pair of end frames, the plurality of battery cells electrically connected to each other at the top of the frames; and at least one cooling fin positioned in the frame and the pair of end frames between the plurality of battery cells; inserting a clamp into the detents in the end frames to maintain compression on the battery pack; transferring the battery pack with the clamp in the detents to a repair station, the ridge supporting the battery pack during the transfer; removing the clamp to permit access to the bottom of the frame; and repairing at least one of the battery cells, cooling fins, frames, or end frames while maintaining the electrical connection.

Another aspect of the invention relates to a battery pack. One embodiment of the battery pack includes a pair of end frames, the end frames having a top and a bottom and a pair of sides, the end frames having a detent on at least one of the sides of the end frames to receive a clamp; a frame positioned between the pair of end frames, the frame having a top and a bottom and a pair of sides, the frame having a ridge on at least one of the sides of the frame; a plurality of battery cells positioned in the frame and the pair of end frames, the plurality of battery cells electrically connected to each other at the top of the frame; and at least one cooling fin positioned between the battery cells.

DETAILED DESCRIPTION

Figure 1:
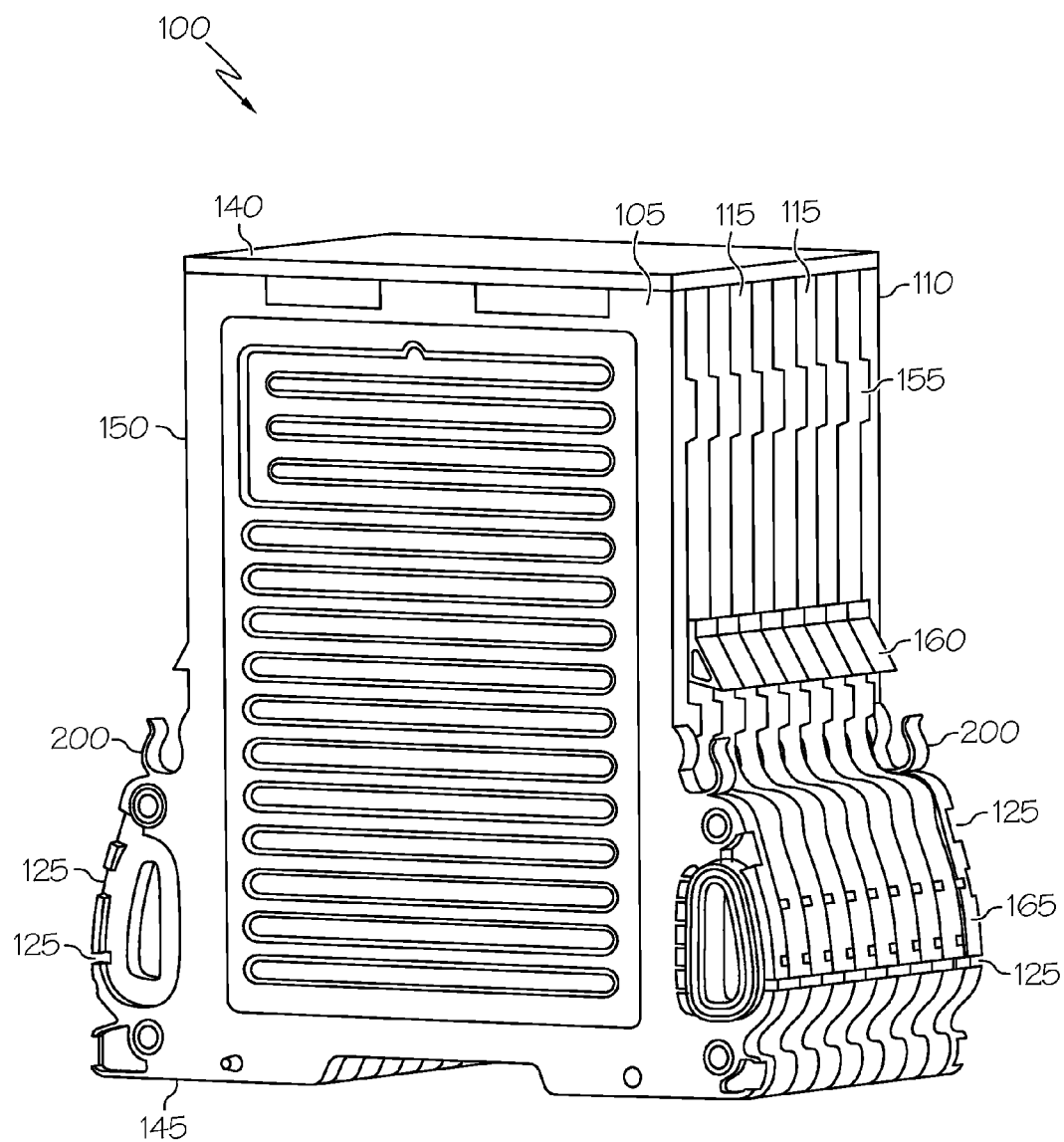
FIG. 1 is a perspective view of one embodiment of a battery pack module of the present invention.

The battery pack module includes a number of design features that aid in the disassembly and repair of battery pack modules. The end frames can include detents that allow clamps to be used to maintain module compression during transfer of the battery pack module to the repair station. The sides of the frame(s) and/or end frames can include a ridge that provides a lifting surface for transporting the battery pack module, as well as providing an interface with the repair cradle. The module can be spread apart at the bottom edge to allow for repair or replacement of various parts, including, but not limited to, cooling fins, coolant manifold seals, end caps, and the center manifold. The module can include modular electrical integration. In addition, there can be section-specific components which allow the modules to be easily separated. These features allow the modules to repaired, reducing the waste of parts which are still usable.

As shown in FIGS. 1-5, the battery pack module 100 includes a pair of end frames 105, 110, with a series of frames 115 between them. There are cooling fins 120 in the frames. The frames 115 and end frames 105, 110 have tops 140, bottoms 145, and sides 150, 155. During use, adjacent battery pack modules can be held together by tie rods (not shown) to form a section. The tie rods are removed after the clamps have been attached as described below.

Figure 2:
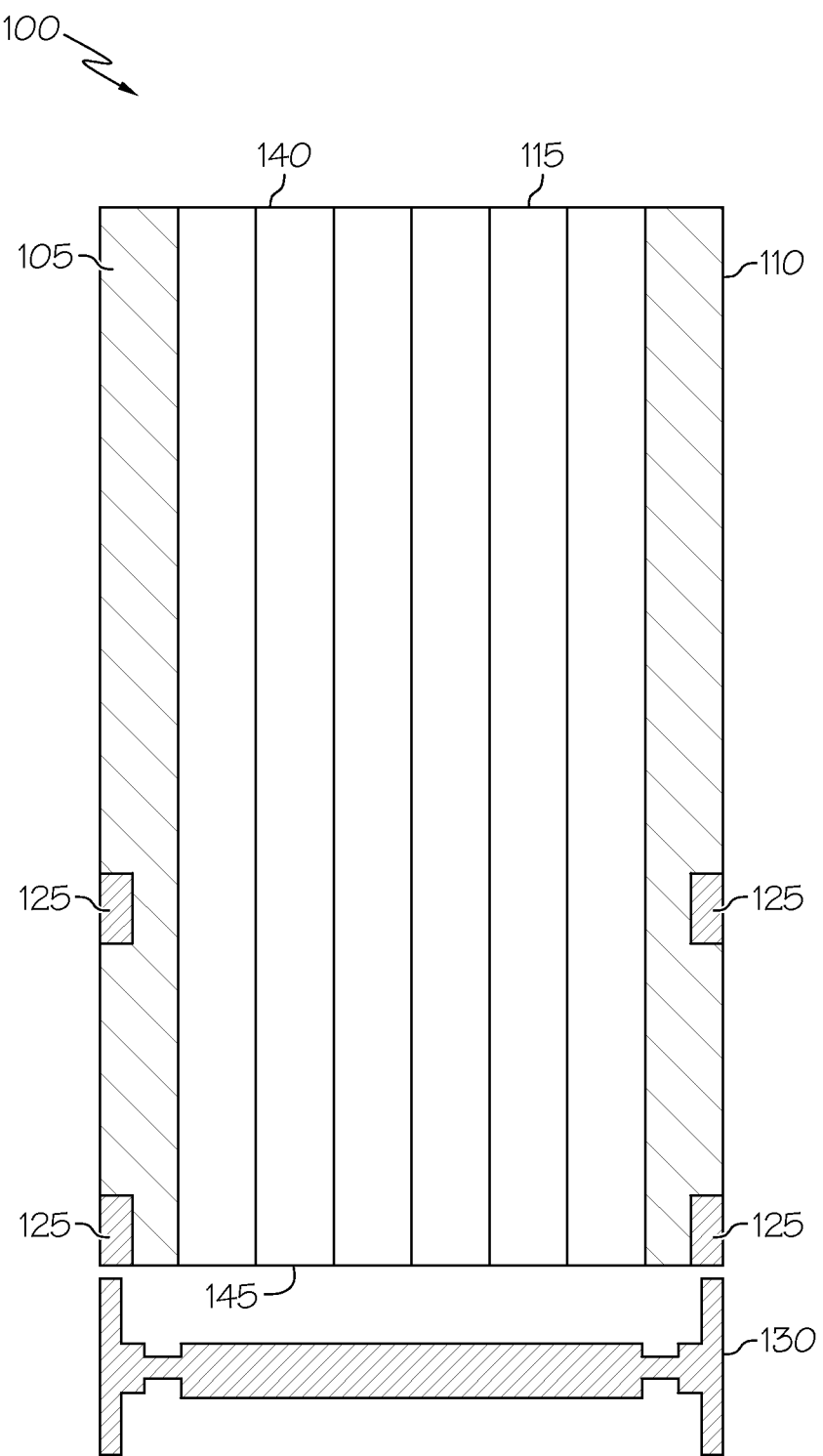
FIG. 2 is a side view of the battery pack module of FIG. 1.
Figure 3:
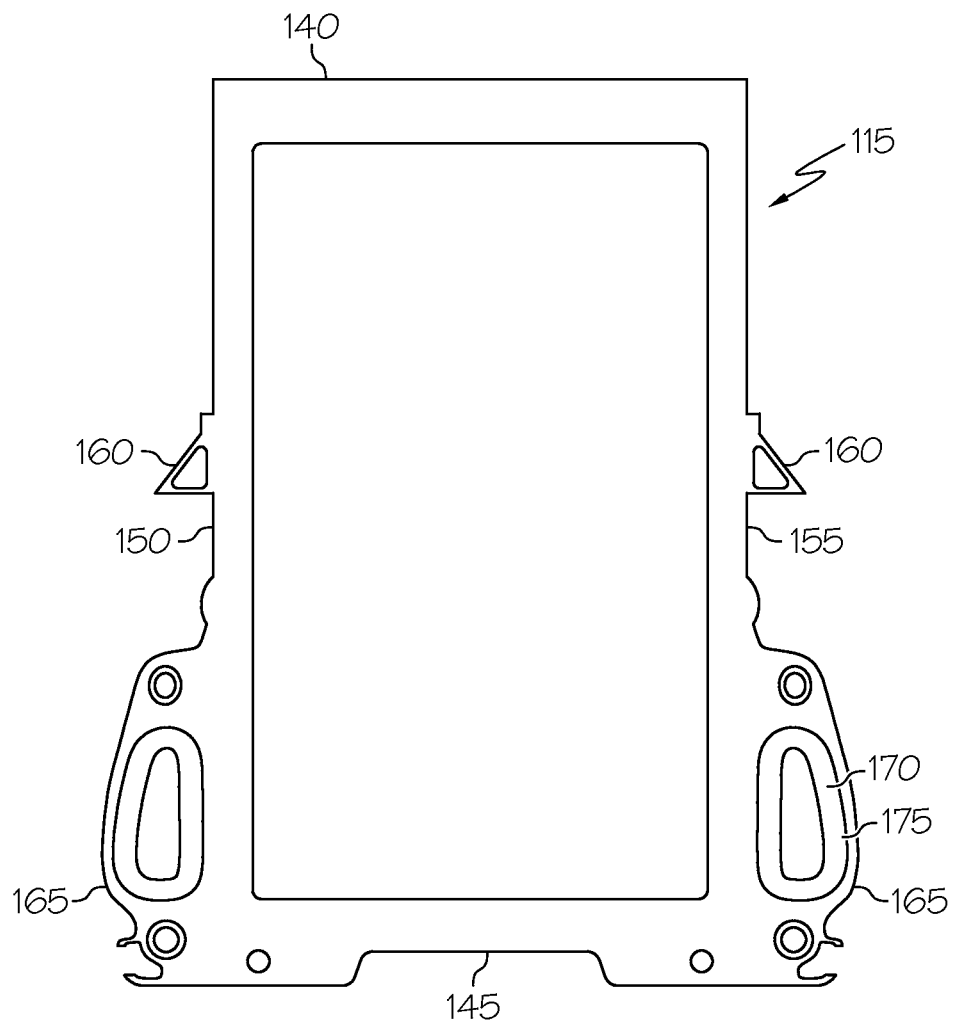
FIG. 3 is an illustration of one embodiment of a frame.
Figure 4:
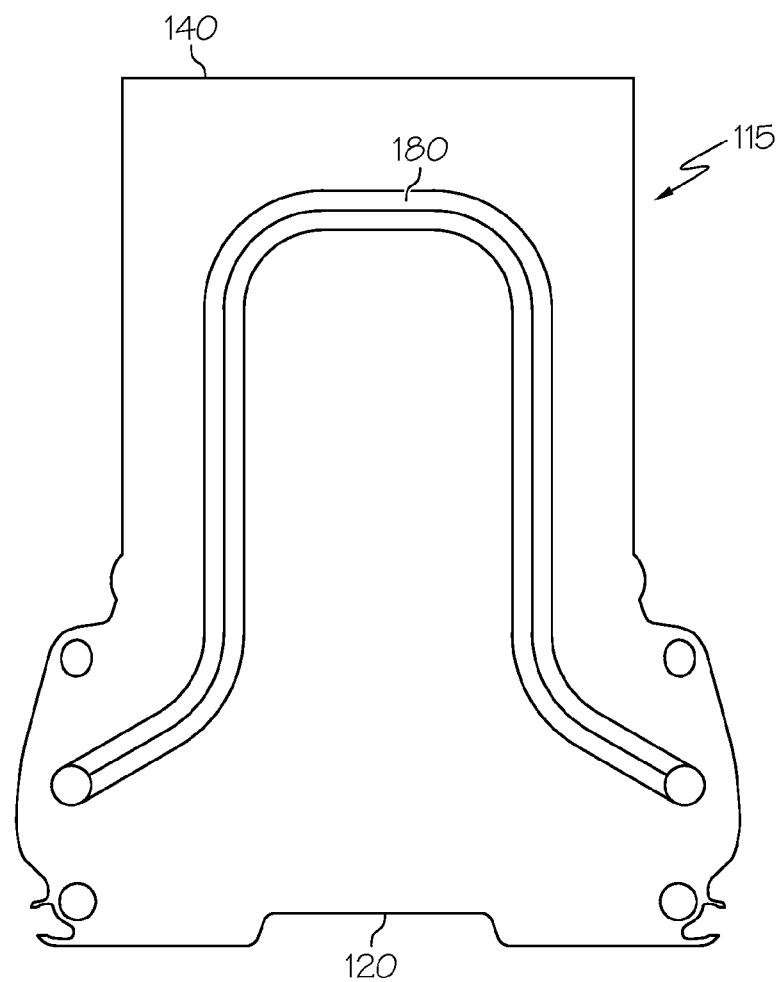
FIG. 4 is an illustration of one embodiment of a cooling fin.

The end frames 105, 110 have detents 125 for receiving a clamp 130. The detents are placed near the lower end 145 of the frames and end frames. For example, as shown in FIGS. 1-2, there are two pairs of detents, one pair above the seal and one pair below the seal. This arrangement helps to maintain seal compression during transport. However, there could be one or more pairs, as desired. A retention feature (such as a projection) on each end of the clamp 130 fits into the detents 125 on each end frame. The clamp maintains compression on the battery pack module when it is outside the battery pack for repair. Suitable clamps include, but are not limited to turn-buckle clamps, and over-center clamps.

Figure 5A:
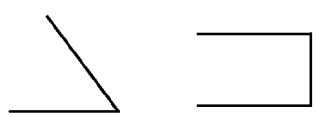
FIGS. 5A-C illustrate embodiments of different shapes for the ridge on the side of the frame.
Figure 5B:
Figure 5C:
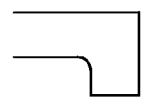

The frames 115 and/or end frames 105, 110 have one or more ridges 160 on one or both sides 150, 155. The ridges 160 provide a surface on which to support the battery pack module while it is being transported. The battery pack module can be placed in a cradle 190 for repair. The cradle 190 can include a rod or bar or the like 195 which fits under the ridge 160. The ridge 160 can be designed to support the rod or bar (or other shape) 195 in the cradle 190. For example, the ridge could be a triangle, or a rectangle with a edge parallel to the top (e.g., as shown in FIG. 5A). Alternatively, it could have an edge which is slighted inclined (e.g., as shown in FIG. 5B) so that it will force the bar toward the battery pack making it more difficult for the battery pack module to slip out of the cradle. Another possibility is that the ridge has a notch (e.g., as shown in FIG. 5C) that will interlock with the rod or bar on the cradle. Other shapes for the ridge will be known to those of skill in the art. It is not required that all of the frames include a ridge. However, a sufficient number of frames should include ridges so that the battery pack module has adequate support.

In some embodiments, the battery pack module will be placed in the cradle 190 with the upper end 140, the end having the electrical connection, on top. In order to work on the module, the cradle with the battery pack module in it will be inverted so that the lower end 145 can be accessed. In this the orientation, the ridge 160 can be used support a bar or rod for the cradle. Alternatively, there could be another ridge or a clip 200 for this purpose.

In some embodiments, the cooling fin 120 can include coolant channels 180. The coolant channels 180 will be in fluid communication with a coolant manifold which supplies coolant to the cooling fin 120. The end frames 105, 110 and frames 115 can include a coolant manifold 165. The frames can include a groove 170 into which a seal 175 is placed to seal the coolant manifold.

Figure 6:
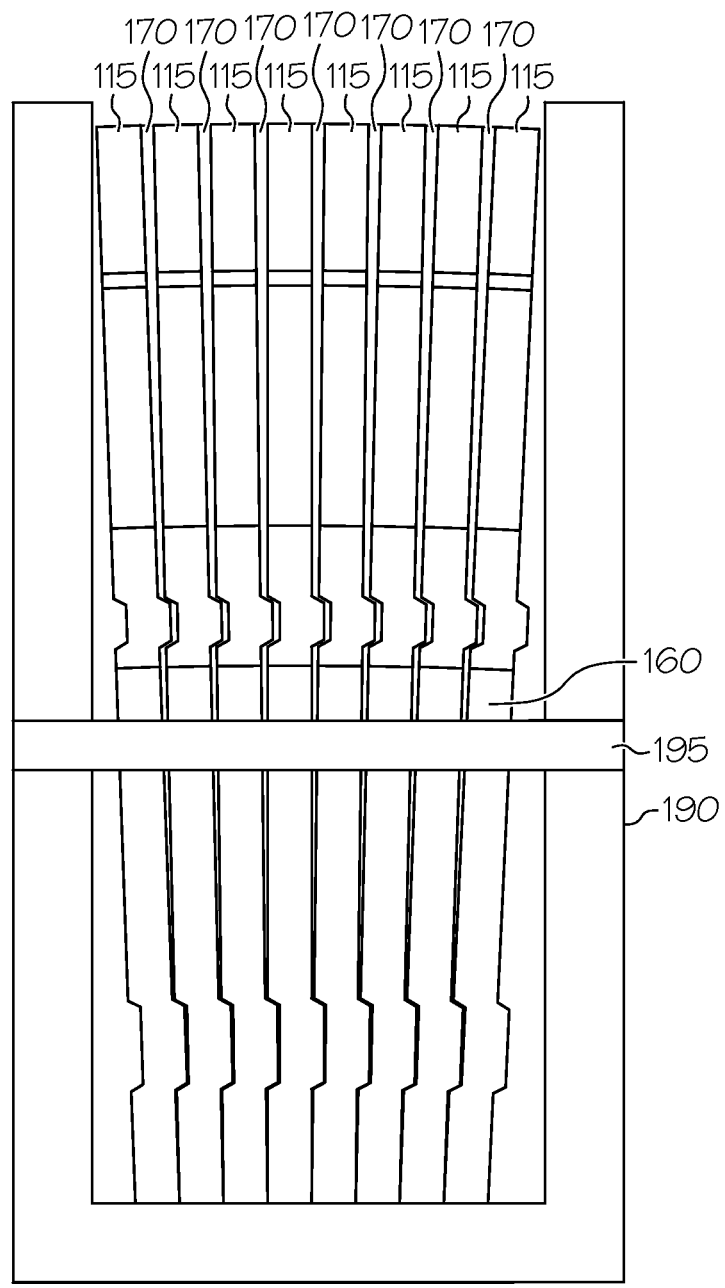
FIG. 6 is an illustration of a battery pack module inverted in a cradle for servicing.
Figure 7:
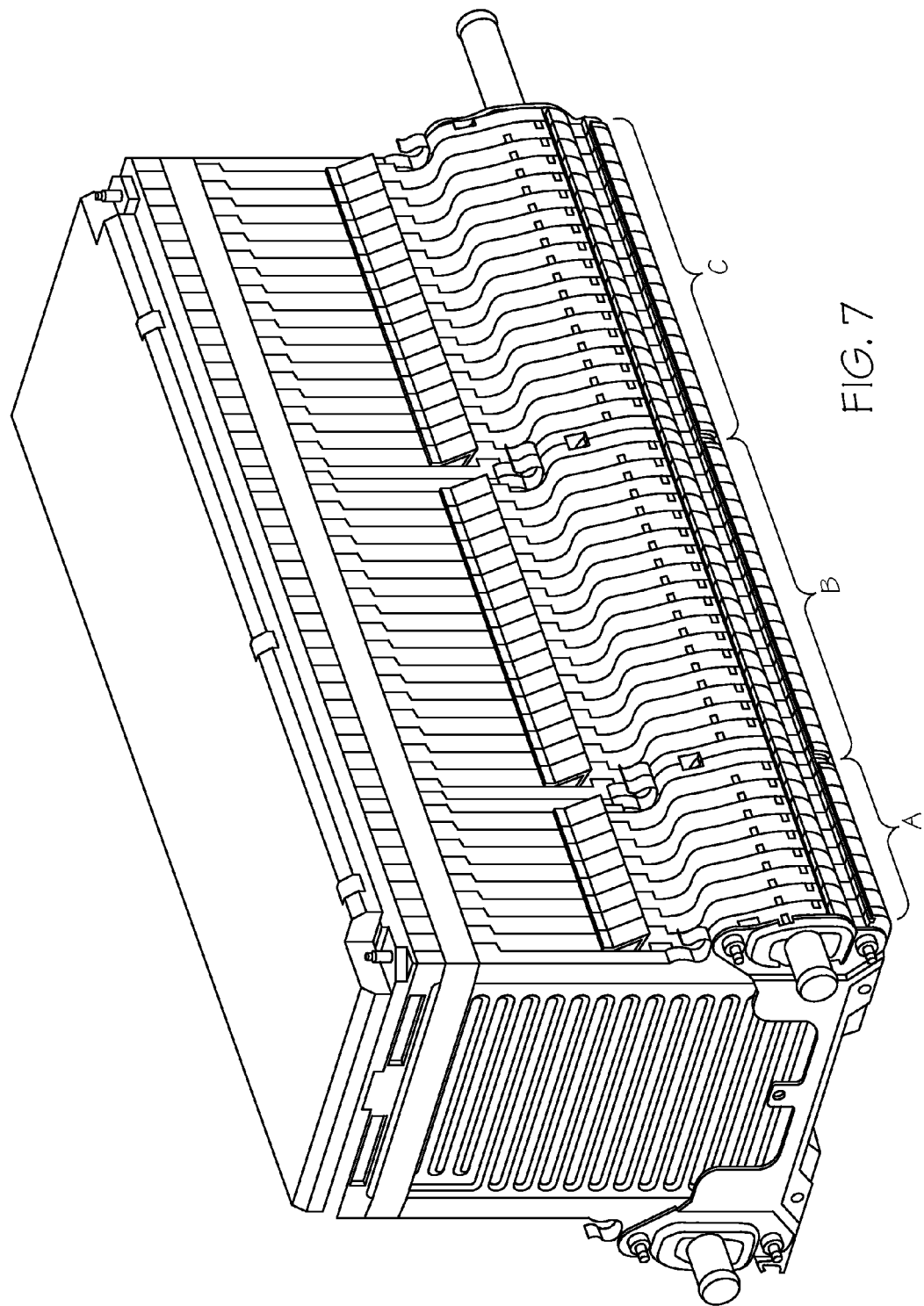
FIG. 7 is a perspective view of one embodiment of an electrical connection for the battery pack module.

A series of modules (A, B, C) including the boards for the electrical connections is shown in FIG. 6. The boards contain electrical buss bars and sensors which are connected to the module.

After the battery pack module has been transported to the repair station for repair, it is positioned so that the individual performing the repair has access to the lower end of the battery pack module (typically by inverting the module). The electric connection on the upper end of the battery pack module is maintained during the repair process so that separation of the frames at the upper end is limited or prevented. When the clamp(s) is removed, the lower end of the battery pack module becomes loose, allowing some movement and separation at the lower end of the frames and end frames. This allows access to the components within the battery pack module for repair. For example, the cooling fin can be removed and replaced, or the seal for the cooling manifold can be removed and replaced. The seal can include a tag, which is an extension of the seal, and it is positioned in the frame. The tag can be gripped with needle-nose pliers, for example, and removed without having to open the module so far that there is a risk of damage to the module.

Figure 8:
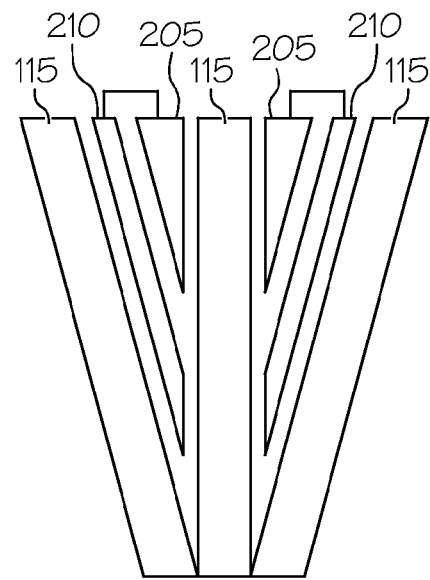
FIG. 8 is an illustration of a portion of a battery pack module spread apart with a frame spreader tool with attached fin guides.
Figure 9:
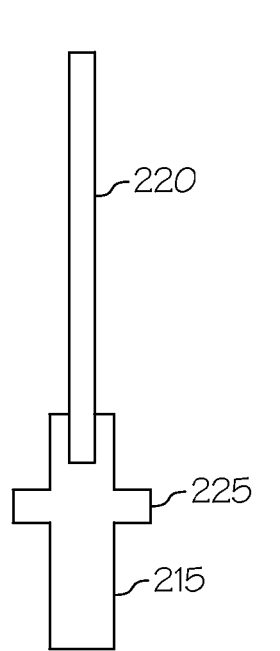
FIG. 9 is an illustration of a pusher tool for inserting a cooling fin into the battery pack module.
Figure 10:
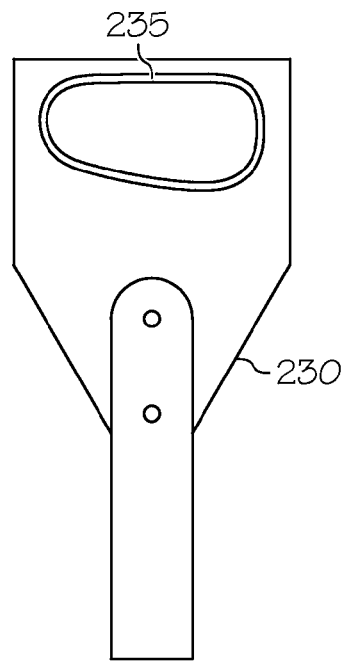
FIG. 10 is an illustration of a seal replacement tool.

FIGS. 8-10 illustrate a variety of tools which can be used in servicing the battery pack module. A frame spreader tool 205 can be used to help separate the frames. It is positioned on the inverted cradle and opens the bottom of the module to provide space between the frames for access to the seals and fins during the repair process. Fin guides 210 can be inserted into the battery pack module between frames to protect the surfaces of the battery cells during cooling fin removal and installation. The fin guides 210 can hang on the rails of the frame spreader tool 205. A pusher tool 215 helps to insert a new cooling fin 220 with minimal required clearance into a module that has been welded. It can include a stop feature 225 that interfaces with the frame spreader 205 to keep the cooling fin from going in too far and making contact with the battery cell terminals causing a short. A seal replacement tool 230 aligns the seal with the grooves in the frame while keeping the operators hands at a safe distance to enable simple installation of a new seal.

The battery pack module can include other components, if desired. Not all of the additional components are required for each module. Therefore, the additional components are designed to be separate from the module so that they can be included as needed. This provides additional versatility.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of repairing a battery pack comprising:
providing a battery pack comprising:
a pair of end frames, the end frames having a top and a bottom and a pair of sides, the end frames having a detent on at least one of the sides of the end frames to receive a clamp;
an intermediate frame positioned between the pair of end frames, the intermediate frame having a top and a bottom and a pair of sides, the frame having a ridge on at least one of the sides of the intermediate frame;
a plurality of battery cells positioned in the intermediate frame and the pair of end frames, the plurality of battery cells electrically connected to each other at the top of the end frames and the intermediate frame; and
at least one cooling fin positioned in the intermediate frame and the pair of end frames between the plurality of battery cells;
inserting a clamp into the detents in the end frames to maintain compression on the battery pack;
transferring the battery pack with the clamp in the detents to a repair station, the ridge supporting the battery pack during the transfer;
removing the clamp to permit access to the bottom of the intermediate frame; and
repairing at least one of the battery cells, cooling fins, intermediate frames, or end frames while maintaining the electrical connection.

2. The method of claim 1 further comprising replacing the clamp and transferring the battery pack from the repair station, the ridge supporting the battery pack during transfer.

3. The method of claim 1 further comprising spreading the intermediate frame and the end frames apart at the bottom.

4. The method of claim 3 wherein the intermediate frame and the end frames are spread by inserting a tool into the battery pack at the bottom.

5. The method of claim 1 wherein repairing at least one of the battery cells, cooling fins, intermediate frames, or end frames comprises removing and replacing the cooling fin while the frame and end frames are spread apart.

6. The method of claim 5 further comprising inserting a tool to protect a surface of the battery cell and to remove the cooling fin without making contact with a cell terminal.

7. The method of claim 1 wherein the intermediate frame or the end frames or both further comprises a coolant manifold, and wherein repairing at least one of the battery cells, cooling fins, intermediate frame, or end frames comprises removing and replacing a seal on the coolant manifold while the intermediate frame and the end frames are spread.

8. The method of claim 1 further comprising inverting the battery pack after transferring it to the repair station.

9. The method of claim 8 further comprising placing the battery pack in a cradle after transferring it to the repair station and inverting the cradle to invert the battery pack.

10. The method of claim 8 wherein the ridge supports the inverted battery pack during repair.

11. The method of claim 8 wherein the intermediate frame, or one or both of the end frames, or both include a clip supporting the inverted battery pack during repair.

12. The method of claim 1 wherein there are at least two intermediate frames.

\* \* \* \* \*